(12) United States Patent
Mikrut (10) Patent No.: US 7,755,869 B2
(45) Date of Patent: Jul. 13, 2010

(54) GROUND PROTECTION DEVICE FOR ELECTRONIC STABILITY AND PERSONAL SAFETY

(75) Inventor: Charlotte Mikrut, Lake Villa, IL (US)

(73) Assignee: Northlake Engineering, Inc., Bristol, WI (US)

(*) Notice: Subject to any disclaimer, the term of this patent is extended or adjusted under 35 U.S.C. 154(b) by 0 days.

(21) Appl. No.: 12/196,807

(22) Filed: Aug. 22, 2008

(65) Prior Publication Data

US 2010/0046129 A1 Feb. 25, 2010

Related U.S. Application Data

(60) Provisional application No. 60/957,197, filed on Aug. 22, 2007.

(51) Int. Cl.
H02H 9/08 (2006.01)
H02H 3/00 (2006.01)

(52) U.S. Cl. ........................................................ 361/42

(58) Field of Classification Search ..................... 361/42
See application file for complete search history.

(56) References Cited

U.S. PATENT DOCUMENTS

| | | | | |
|---|---|---|---|---|
| 5,666,255 A | * | 9/1997 | Muelleman | 361/111 |
| 5,689,180 A | * | 11/1997 | Carlson | 323/359 |
| 5,781,386 A | * | 7/1998 | Muelleman | 361/43 |
| 6,040,969 A | * | 3/2000 | Winch et al. | 361/82 |
| 6,121,765 A | * | 9/2000 | Carlson | 323/359 |
| 6,166,458 A | * | 12/2000 | Redburn et al. | 307/105 |
| 6,358,029 B1 | * | 3/2002 | Niimi | 425/107 |
| 6,560,079 B1 | * | 5/2003 | Hirsh et al. | 361/42 |
| 6,697,238 B2 | * | 2/2004 | Bonilla et al. | 361/42 |
| 7,196,885 B2 | * | 3/2007 | Pierce et al. | 361/42 |
| 2006/0187594 A1 | | 8/2006 | DiSalvo | |

* cited by examiner

Primary Examiner—Ronald W Leja
(74) Attorney, Agent, or Firm—Nicholas A. Kees; Godfrey & Kahn, S.C.

(57) ABSTRACT

A ground stabilization network including a circuit with an EMI filter circuit to filter out ground referenced interference and internal fault current detection circuitry with an integrated trip circuit to stop the flow of power in case of a fault condition, which might result in a safety hazard. The EMI filter circuit includes a resistor and a reactive portion, both connected in parallel between neutral or return line and ground, mounted between the trip circuit and a current sensor. The current sensor senses differences between the current in the hot or positive line and the current in the neutral/negative or return line, and causes the trip circuit to trip if a predetermined difference in current is sensed.

15 Claims, 3 Drawing Sheets

GROUND PROTECTION DEVICE FOR ELECTRONIC STABILITY AND PERSONAL SAFETY

CROSS-REFERENCE TO RELATED APPLICATION

This application claims the benefit under 35 U.S.C. Section 119(e) of U.S. Provisional Patent Application Ser. No. 60/957,197, filed Aug. 22, 2007.

BACKGROUND OF THE INVENTION

The present invention generally relates to an improved ground protection device combining specially designed reactive/resistive filtering components placed in such a way to work in unison with protective safety elements as sophisticated as longitudinal transformers, sense electronics, rectifiers, and trip coils or as simple as thermal-magnetic trip circuitry in order to disconnect power in the case of a fault condition hazardous to humans, thereby providing a fully integrated device that stabilizes the ground reference plane for electronic system protection along with circuitry to control power flow during fault conditions.

"Conventional" grounding techniques utilize different methods in an effort to improve the integrity of the digital ground reference, including running cross sections of braided copper wire in 1 ft×1 ft sections to attempt to provide equipotential grounding to reduce or eliminate undesirable electrical "noise." Various forms of ground control have been tried over the years in different applications, although most techniques still rely on methods that either intentionally float the ground or add secondary ground reference points between equipment, which can under certain circumstances create a hazardous ground potential difference.

A word about grounding and other forms of protection: Most surge suppressors/surge protection devices (SPDs) and Electromagnetic Interference (EMI) filters do require grounding and use the grounding reference to block, absorb, or shunt impulses originating on the hot or neutral. While it is still considered good practice to use protective elements in all three modes (Line to Neutral, Line to Ground, and Neutral to Ground) many devices now only utilize suppressive elements between Line and Neutral so as to not contribute to interference on the ground line.

U.S. Pat. No. 5,689,180 is an example of an isolated electrical power supply based upon transformer technology.

U.S. Pat. No. 5,666,255 ("the '255 patent") discloses transformer-less conditioning of a power distribution system consisting of an electronically enhanced filter (EEF), a ground fault circuit interrupter with a connection to ground, and "low" and "high" level ground conditioning. There are however some important limitations to the '255 patent. First, although the '255 patent discloses a connection to ground through a mid-point tap with capacitors between line to ground and neutral to ground (and/or) via the ground fault circuit interrupter (GFCI), it also states, at Column 2, line 64, that "[t]he power distribution system has a connection to ground and may have a ground line." The '255 patent specifically cites, at column 3, line 5, that "[t]he common mode filter has an impulse capacitor connected at one end to the midpoint tap and at the other end to ground. The common-mode filter utilizes the inductors of the power and neutral lines [and] an impulse detector and switch . . . adapted to close upon detection of the transient impulse at the mid-point tap so as to attenuate the transient impulse by shunting it to ground." In addition, the power conditioner disclosed in FIG. 9 and column 10, line 51, "provides another type of normal mode and common mode filter for operating on hi-polar impulses with zero or small values of operating voltage" for communication systems. And at column 11, line 32, the power conditioner is described as meeting "the attenuation specification when tap 72 [the neutral-to-ground tie to the EEF] has an operating voltage nearly equal to zero volts . . . " Most important, as described in the '255 patent at column 11, line 48, "[g]round conditioning can be defined as the safe insertion of an impedance in the ground line 40 in the electrical circuit of the power distribution system without compromising electrical fault protection." However, the '255 patent specifically discloses, at column 11, line 56, that "[t]ypically, ground references are described as earth ground and safety ground. Earth ground (EG) is a ground reference with line that returns to earth potential (absolute ground) with as little impedance as practical. Safety ground (SG) is a near earth potential, low impedance reference line that returns equipment ground fault currents to the over current protector." FIGS. 10 & 11, described in this section of the '255 patent, show the distinction between low and high level ground conditioning.

U.S. Pat. No. 5,781,386 shows a ground conditioning circuit that limits the impedance capabilities for real world use. The circuit clearly has an impedance before the chassis ground connection, that is, between Earth Ground "EG" and Safety Ground "SG". In addition, the GFCI with bypass circuit places the ground conditioning device before the GFCI and before the chassis ground connection.

U.S. Pat. Nos. 6,166,458 and 6,358,029 rely on various forms of grounding impedances or attenuation circuits in the ground in an effort to block noise, surges, ground loops and high frequency interference from degrading or destroying connected equipment. In fact, U.S. Pat. No. 6,385,029 is similar to the '255 patent in that it shares high and low level ground noise attenuation, and utilizes a capacitor (Pat '029, column 3, line 53) connected to a source and neutral lead, further connected to the primary earth ground at node A, which is electrically different from the electrical load ground line 148, which is in turn connected to a node B which is joined to a floating ground FG via lead line 150. In this respect the '255 patent and the '029 are "electrically similar" in that they distinguish an electrical difference between the earth ground input (EG in both) and the load ground (Safety G in the '255 and Floating Ground FG in the '029) which create a ground differential.

U.S. Pat. No. 6,040,969 discloses a means to meet UL leakage requirements while providing "superior" suppression of neutral-to-ground voltage and disturbances, in addition to correcting reverse polarity conditions as detected by the sensing circuit described in the second embodiment of the of the '969 patent. In actuality, the only performance advantage achieved by the '969 patent is that its polarity protection circuitry enables it to reduce the rating of the surge protection components between neutral and ground, and if certain conditions exist, a direct short is created instead of the standard surge protection circuitry.

U.S. Pat. No. 6,697,238 discloses a GFCI with secondary test switch contacts which senses improper wiring of the GFCI device causing the secondary circuits to short circuit between the AC input terminals, blowing a fuse to disable the GFCI, but does nothing more to protect against ground referenced noise and neutral to ground potential differences.

U.S. Pat. No. 6,560,079 applies to a thyristor whose gate is controlled by the potential state of the ground conductor; if this state is substantially at zero, the gate closes to allow flow of current to load; if this state is not at substantially zero volts with respect to ground, the gate opens, turning off power to the loads. The drawback here is that the ground typically carries substantially more than zero volts, so depending on the sensitivity threshold, false tripping could occur.

In general, there is a misunderstanding regarding typical GFCIs. Conventional wisdom would lead one to believe that these devices actually require a connection to the ground line to sense a ground fault condition and block power. To the contrary, standard ground fault interrupters do NOT require any connection to the ground line. Standard GFCIs have a number of inherent drawbacks, which can lead to premature failure, false tripping, internal circuit damage, external load damage, and most importantly, a false sense of security in terms of safety.

Effective grounding serves many purposes, including provision of the power system reference, personnel protection from electrical shock, lightning protection, digital logic reference, equalization of ground potentials to inhibit ground loops and current from flowing through data and audio/video cabling. Conventional conditioning technologies, power filtering devices, surge suppressors (SPDs), EMI filters, and ground fault circuit interrupters perform many important functions; however, they still tend to fall short when it comes to real ground line problems.

There have been a number of methods developed over the years to address unwanted frequencies in order to protect operation of digital circuitry. However, each device has its own drawbacks, or is just too costly to implement, making the design itself not an option in the market especially if it is too costly or unable to meet safety standards. In addition, "home-grown" solutions to interference problems have been developed ranging from forming a coil in the power cord (which could actually create additional impedance to 60 cycle fault current and high frequency interference), to floating the ground wire by lifting the ground pin, to using driven ground rods at more than one point within a facility to attempt to achieve a zero-reference earth ground, to implementing balanced power systems where 60 volts is connected between line and ground and 60 volts between neutral and ground. Each of these situations can create additional safety and performance problems for the user and the equipment, so none of these "fixes" really address the full extent of the electrical and electronic problems.

Two issues are important to understand as they relate to the purpose and need for the invention disclosed herein.

First, electronic loads with sophisticated digital circuitry have taken the place of conventional electrical loads. As this digital revolution continues and technology keeps progressing at an alarming rate, the cost of new technology is driven lower and lower, while at the same time, consumers are seeking more product feature for the same amount of money with each new release/upgrade. This evolution benefits the consumer over the manufacturer, as profit margins wither away. In order to meet the higher level expectations of features versus cost, many manufacturers have eliminated excess components in their equipment to meet the market's price expectations, while still maintaining certain levels of performance.

Second, as the digital revolution evolves, the dividing lines between industries, markets and applications start to disappear. Five years ago, information technology systems (IT) and data centers were considered the "mission critical" places where line conditioners were applied. Today, digital imaging and audio/video communications have become a sub-set of every market: entertainment, gaming, home theater, banking, retail, manufacturing and control, transportation, failure analysis, security, personal and global communications. As these trends continue, the problems once only known to A/V technicians, facility engineers and electronic engineers have become common-place, even to home entertainment enthusiasts.

The problem that exists is that "fixes" implemented in professional installations cannot be used in many environments where personnel or equipment safety may be compromised (floating grounds, separate driven ground rods, balanced power, etc.). In addition, the market cannot bear the use of bulky, expensive systems relied on in the past to protect sensitive electronics, whether installed internal or external to the electronics in question.

More and more systems now rely on the conversion of signals with extremely fast transfer times having a lower and lower tolerance range for the digital signal conversion (audio, video, and digital).

Impulses are not the only occurrences that destroy chips; low and high level voltage surges, as well as very low level current flow, disrupt system performance and signal integrity. Other technologies fail to address the lower level, low currents that can more of a problem than transient impulses. Secondly, prior art does not take into consideration a two wire environment, such as DC applications.

In the audio world, the audio bandwidth is typically considered to be in the 20 Hz to 20 Khz frequency range—those that humans can actually hear. However, a much wider frequency range, from subsonic (too low to hear at 0-20 Hz) to ultrasonic levels, can and do interfere with the intended signals. Audio is affected by undesirable noise when it creeps into the intended signal, robbing the output of its dynamic range and can even burn out coils in speakers and sub-woofers. Low order harmonics 60-120 Hz can show up as what is commonly referred to as 60-cycle hum. Fixed frequency noise is any unwanted signal that remains steady (or close to it) over time such as DC offset, hum and buzz from ground loop currents, and acoustical noise from mechanical and linear loads. AC hum is the classic fixed frequency contaminant, but the harmonics (multiples of the 60 cycle fundamental frequency) are often more of a problem that couples into the signal paths relatively easily via inductive and capacitive coupling. In connection with audio and video signals, ground currents and noise create horizontal hum bars (light or dark lines that creep up on a monitor) and a low level audio hum. Impulse noises are those pops and clicks that remain on recordings, or show up in digital imaging as timing errors, jitter, or strange bits on the screen. Digital clipping occurs when a signal peak (entering through the digital reference plane) exceeds the binary range of the A/D converter or internal signal processing system.

As clock frequencies extend beyond a few hundred megahertz, digital pulse width edges into the sub-nanosecond range, and networking interfaces deliver data at rates exceeding 100 Megabits per second, the importance of a high quality power and reference ground source free of interference is essential to combat signal and data loss and improve performance. Most importantly, fast changing pulses of current and noise on the ground reference plane can cause "etching" on the integrated circuits within sensitive devices, leading to early failure of the system and corrupt data. As users invest more in high end imaging systems for uses including medical, security, entertainment, industrial, and transportation applications, they insist on the highest quality image, information output and total overall reliability on their investment.

SUMMARY OF THE INVENTION

The present invention provides a specially engineered resistive-inductive ("RL") circuit forming part of a ground "stabilization" network, implemented in a neutral-ground configuration, to overcome the limitations of the prior art.

The present invention is designed to meet specific safety requirements when used with conventional Ground Fault Circuit Interrupters and over-current protection devices. The present application relates to a passive bi-directional filter placed in the power distribution system that incorporates a parallel RL circuit coupled between the grounded conductor (N) and the ground conductor (G) of an electrical distribution system in such a way to not impede fault current flow or ground referenced neutral return currents, while it functions to filter and re-direct noise and transients thereby stopping propagation of ground loops, ground referenced impulses, high frequency noise and other forms of interference that could otherwise affect performance, system and signal integrity and audio/video signals.

Unlike the prior art, the present invention comprises a circuit that remains in the power distribution system at all times, while the filtering properties are actually improved when energized and loads are connected to the output. This is due to the fact that the RL circuit takes advantage of the normal and expected operation of the neutral (return) and ground line to perform its intended filtering functions best. Unlike conventional thought, however, the circuit re-connects the grounded conductor (neutral) to the ground, at a point that until now has been avoided due to safety standards and electrical agency recommendations. Until the present invention, connecting neutral to ground has been considered to be a potential safety hazard, since it creates a secondary (parallel) path for fault current to flow.

To fully meet the existing equipment requirements for safety and system reliability, the present invention has been designed with secondary protective elements.

DETAILED DESCRIPTION OF THE PREFERRED EMBODIMENTS

Figure 1:
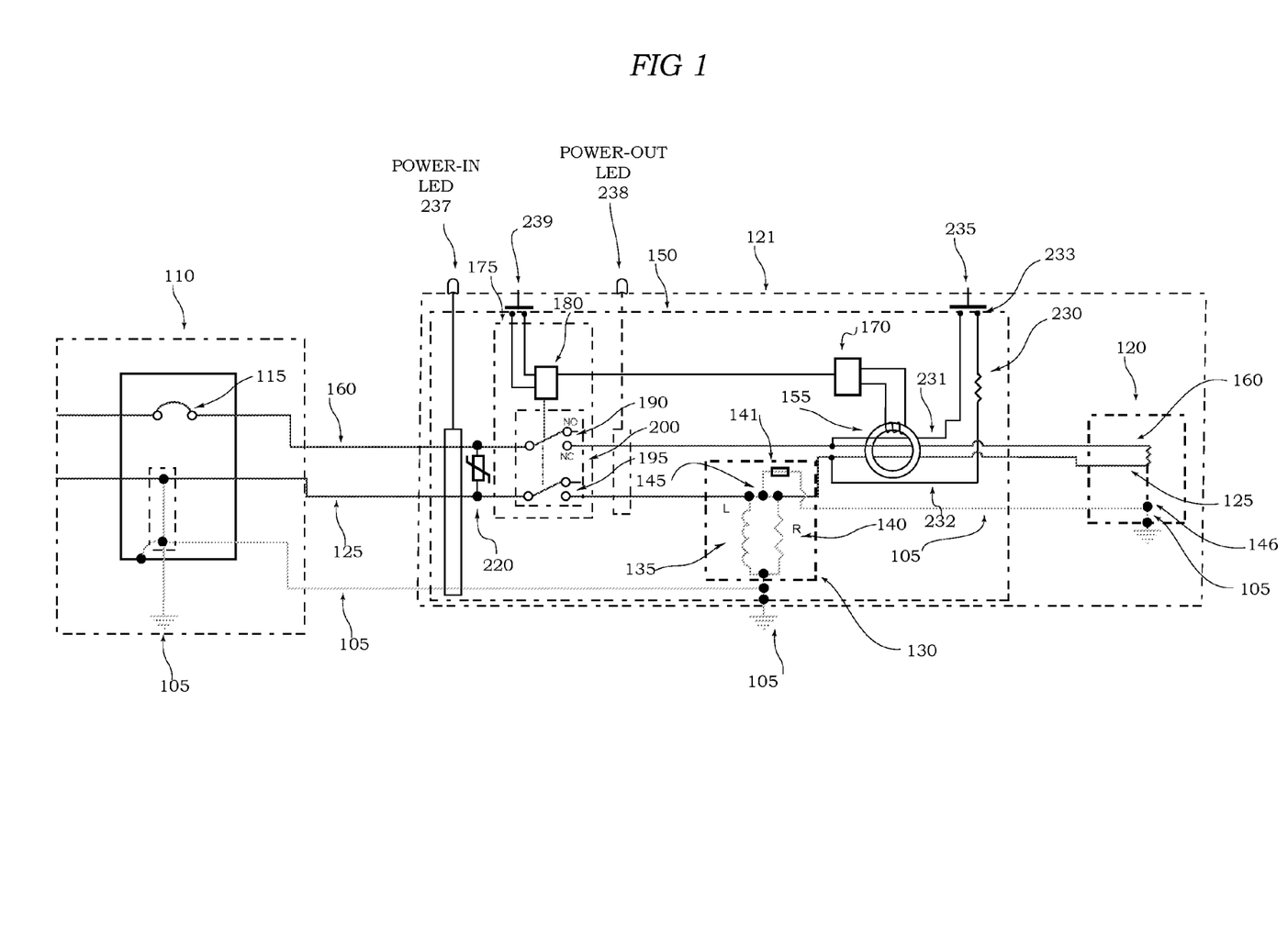
FIG. 1 is a circuit diagram of a circuit according to one embodiment of the invention.

Referring in detail to the drawings, there is shown in FIG. 1 a schematic diagram of an improved ground stabilization network, that is, a circuit 150 for providing stabilization of the ground reference plane, and integral ground fault protection, and filtering out various types of undesirable noise as described above. FIG. 1 shows the circuit 150 of the ground stabilization network in a simplified form, connected to a power source 110, having a hot line 160 and a neutral line 125, and to a separate load 120. The circuit 150 may be employed as a) a stand alone device, for connection into an AC power distribution system, with a power source, or a DC supply (each of which is supplied with over current protection 115), or b) as an integrated device 121 integrated with the load 120, or c) as a circuit within another power protection device. As depicted in FIG. 1, depending on the application that requires protection and the most cost effective method to attain such protection, any such use may be implemented.

As shown in FIG. 1, the circuit 150 includes an EMI filter circuit 130, which in the preferred embodiment provides a ground stabilization function. In the preferred embodiment, EMI filter circuit 130 includes a specially designed inductive (reactive)/resistive parallel component network that provides filtering across a wide frequency range from Hz to GHz at low and high voltage and current levels, coupled between a grounded neutral point 145 and an earth/chassis ground 105. The connection point 145 between the EMI filter circuit 130 and neutral line 125 forms a reference to equalize ground potential differences.

The preferred embodiment of the EMI filter circuit 130 includes a resistor 140 and a reactive portion, preferably an inductor 135, both connected in parallel between the neutral line 125 and the ground 105. An optional high frequency filter 141 is connected between a neutral/ground connection point 145 and the output ground connection 105. High frequency filter 141 is optionally provided to bleed off and/or filter any high frequency noise radiating on or conducted through the ground connection. High frequency filter 141 is most useful in an application where the circuit 150 is to be used at the signal/electronic operating frequency of certain electronics to be connected, as various types of electronics create different levels of noise and operate at specific respective frequencies where such noise could cause further corruption.

Figure 2:
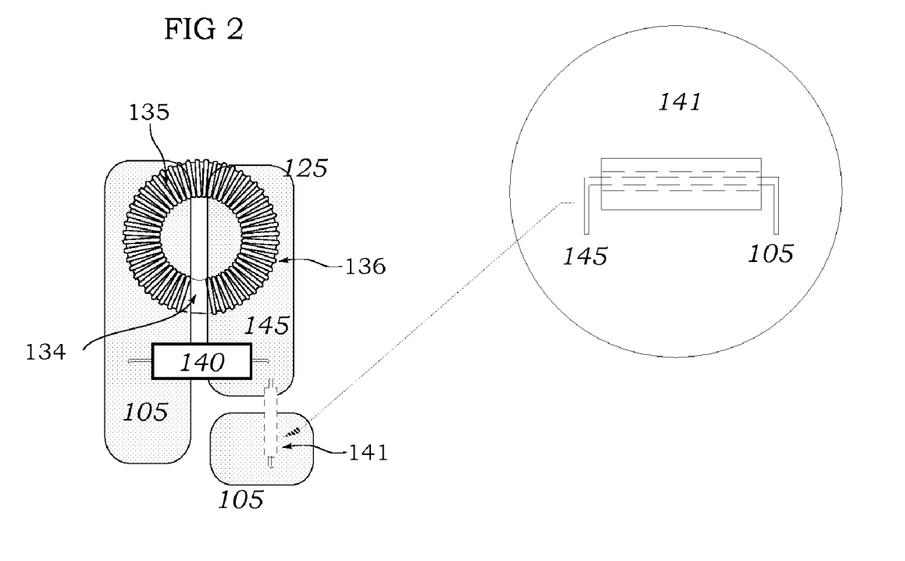
FIG. 2 is a detail view of the physical construction of the EMI filter circuit depicted as a part of the overall circuit shown diagrammatically in FIG. 1, including an inset with an optional component.
Figure 3:
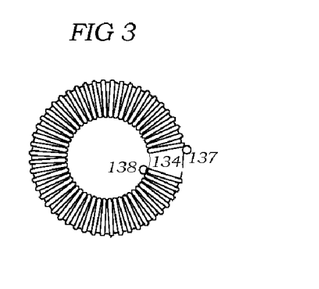
FIG. 3 is a top plan view of the physical construction of the inductor shown in FIG. 2 as a part of the EMI filter circuit shown in FIG. 2.
Figure 4:
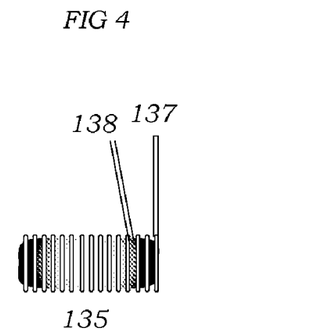
FIG. 4 is a side elevation view of the inductor shown in FIG. 3.

FIG. 2 shows the most preferred embodiment for single phase applications under 20 Amps at 120 Volts. As shown there, inductor 135 is formed with a properly sized magnetic copper wire 136 sized according to the maximum voltage and current likely to be imposed through it. The wire 136 is wrapped about a composite core 134 formed of high permeability ferrous (20-40%) and iron powder material (60-80%). That the core 134 is formed of a composite material is important for electromagnetic interference (EMI) and low frequency currents, having minimum breakdown voltage withstand level over 1000 Volts RMS for power applications. Ferrite/Iron composite cores change in inductance based on the current levels. As depicted in FIG. 3, composite core 134 of the inductor 135 is wound with wire 136 in a single layer with no overlapping turns and maintaining a minimum of 0.25 inches between the input end 137 and output end 138 of the wire 136 to the core 134. The windings are wrapped so the input end 137 and output end 138 exit on opposing sides of the core 134. The inset to FIG. 2 shows the optional high frequency filter 141 between the neutral/ground connection point 145 and the output ground connection 105. The function and application of high frequency filter 141 is described above. In situations where the composite core does not successfully filter off all the noise levels, this filter bead 141 is known to be available in various forms, sizes and mixes to provide an added level of filtering.

Due to the connection 145 between neutral 125 and ground 105 within the EMI filter circuit 130, safety agencies require protection for personnel safety, which is why the circuit 150 is considered the overall ground stabilization protection network.

As shown in FIG. 1, the circuit 150 further includes a current sensor 155, typically of a 1000:1 value, which must be connected after the EMI filter circuit 130. It is known that a current sensor can be employed as a current probe, a differential amplifier, a longitudinal transformer, Hall effect sensor, or current transformer, based on the current and voltage levels. In the circuit 150, current sensor 155, depicted as a current transformer for simplicity, is employed to "sense" any differential between the current flowing from the hot line 160 to the load 120 and returning through the neutral line 125. If a fault condition exists, that is, if the current flowing in the hot line 160 is different than that flowing in the neutral line 125, there is current returning through an alternate path, rather than through the neutral line where it should return. Hence, current sensor 155 is provided for the purpose of sensing any difference, even as small as a few milliamps, between current flowing to the load 120 and that returning from the load. When such a difference is sensed, the current sensor 155 sends a signal to an evaluator controller 170.

In turn, controller 170 evaluates the difference being sensed against a predetermined limit and sends to a breaker trip circuit 175 a signal, which can be termed a "fault signal," when the limit is reached. Breaker trip circuit 175 is connected before the EMI filter circuit 130. As shown in FIG. 1, breaker trip circuit 175 includes a breaker controller 180 and a two-pole breaker 200, or alternatively, breaker controller 180 can be integrated with evaluator controller 170 as a single controller. While breaker 200 may take many forms, in the embodiment shown, the breaker 200 includes two sets of breaker contacts 190 and 195. The signal from controller 170 to breaker trip circuit 175 causes breakers 190 and 195 of two pole breaker 200 to trip into an open state, thereby preventing any flow of current on the hot line 160 and the neutral line 125 to the EMI filter circuit 130, and further, protecting personnel and equipment from a fault condition or shock hazard. A reset switch 239 is included to reset the breaker 200 once any fault condition is corrected. In the embodiment shown in FIG. 1, the reset switch 239 is a manual reset switch, but many different configurations of manual and automatic reset switches and circuits are available, as is known in the art.

In general, circuit 150 preferably includes a test circuit in order to ensure that the circuit 150 is functional as required by safety standards. Many different configurations of manual and automatic test circuits are available, as is known in the art. In the embodiment shown in FIG. 1, the circuit 150 includes a manual test circuit 235, as but one example. The test circuit 235 includes a resistor 230 connected at one side to a switch 233. The opposite side of the switch 233 and the opposite side of the resistor 230 are each connected via test lines 231, 232 to a respective one of the hot line 160 and neutral line 125. One test line 231 passes through the current sensor 155 and the other test line 232 does not. Hence, closing the switch 233 results in a current flowing through the loop constituted by the switch, the resistor 230 and test lines 231 and 232. The fact that one of the test lines 231 passes through the current sensor 155, and the other test line 232 does not, causes the current sensor to "sense" the passage of current as a potential fault since there will exist a differential between the current flowing in the two test lines. Such condition will open the breaker 200, thereby confirming the function of the current sensor 155, the controller 170 and the trip coil breaker circuit 175.

A single metal-oxide varistor (MOV) 220 is shown in FIG. 1 connected before the breaker trip circuit 175, for protecting the circuit 150 from power surges. Additional MOVs or other surge suppression and normal mode filtering may be added as desired within the circuit, preferably before the EMI filter circuit 130, so that the EMI filter circuit will block any shunted impulses or noise from the load 120.

The embodiment shown in FIG. 1 also includes two LED indicators, the POWER-IN LED 237 and the POWER-OUT LED 238. The POWER-IN LED 237 is illuminated when the circuit 150 is properly receiving power from the power supply 110. The POWER-OUT LED 238 is intended to be an indicator for the state where the breaker circuit 200 has been tripped. In the configuration shown, the POWER-OUT LED 238 is lit when the breaker circuit 200 is closed, and switches to being unlit when the breaker circuit trips to open. Numerous other indicator arrangements are available and well known in the art. For example, POWER-IN LED 237 is shown connected to all three of the hot line 160, neutral line 125 and ground 105. The connection to ground 105 is more optional than the other connections shown for POWER-IN LED 237. Some such indicators include LEDs as described explicitly here, and some include other means of indication, including audible alarms.

The simplest form of the circuit is shown in FIG. 1, but other components may be added, or the circuit multiplied, for example in the case of two- and three-phase systems, to achieve the same results. In the case of higher voltage systems, a larger size core and resistor would be used to accommodate the larger wire size. The number of EMI filter circuits would be increased to accommodate the number of neutral lines while maintaining the same base design criteria. That is, in a three-phase system with three neutral lines, for example, three EMI filter circuits would be needed. But for a three-phase system with a shared neutral line, a single EMI filter circuit could be sufficient.

Neutral/Ground connection 146 illustrates a ground connection condition that can possibly happen or come into existence under certain conditions at the load 120, mainly when the load is electronic, such as a switching power supply connection to ground, or an integrated circuit connection to reference ground 105.

In addition, other than using a toroidal core, other materials may be more advantageous such as filtering of the electrical trace, electrical wire, copper wire, or magnet wire by placing it over, around, or wound only once around any such ferrous material, to filter conducted and radiated energy where said energy is either passed through the wire or filtered if radiated or picked up on the skin of the wire via said ferrous material.

The application of the circuit 150 described here overcomes many of the disadvantages of the prior art, and provides a high level of safety and equipment performance. The positioning of the EMI filter circuit 130 after the breaker circuit 175 is critical because the power must be disconnected before it reaches the neutral-ground bond that exists in the EMI filter circuit. If the EMI filter circuit were before the breaker circuit 175, and the breaker 200 opens, power is still coming into the EMI filter circuit and could be transmitted to the chassis or case of the overall ground stabilization network, assuming the ground is connected to that chassis. And the current sensor 155 is required to be after the EMI filter circuit 130 because the current sensor is sensing the power going in and the power coming out of the load, that is, the power on the hot line in reference to the power on the neutral line. And the current sensor 155 senses if there is a neutral ground bond, so the current sensor is required to be connected after the EMI filter 130. Otherwise the current sensor 155 will keep the breaker 200 open, and therefore the circuit 150 would be turned off, at all times.

Figure 5:
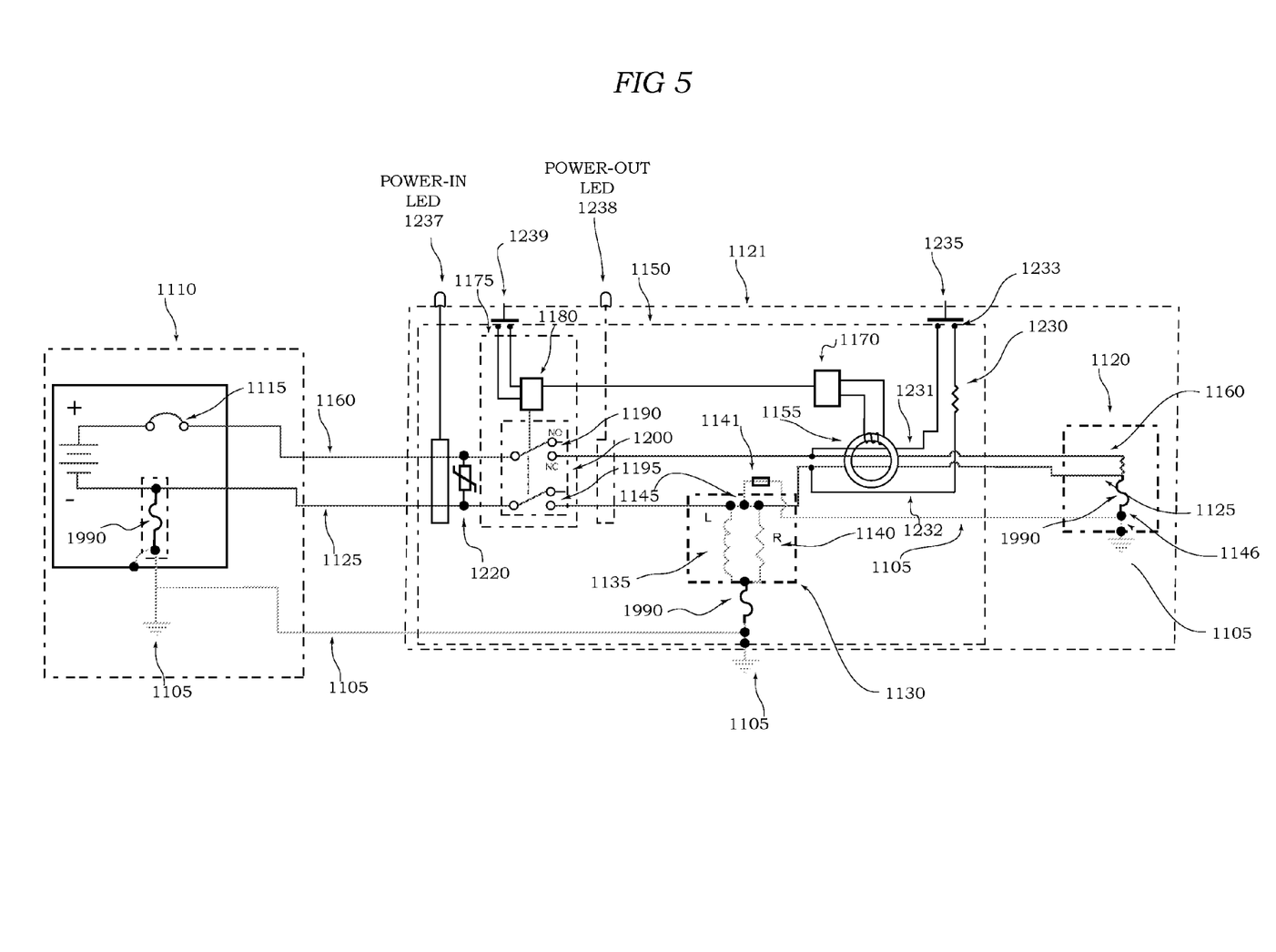
FIG. 5 is a circuit diagram of another embodiment of the invention as applied to a direct current power supply.

Referring to FIG. 5, there is shown a schematic diagram of a ground stabilization network 1150 according to the invention, but as applied to a direct current (DC) power supply 1110, which is supplied with over current protection 1115

Similar to the embodiment shown in FIG. 1, the circuit 1150 includes an EMI filter circuit 1130, which in the preferred embodiment provides a ground stabilization function. In the preferred embodiment, EMI filter circuit 1130 includes a specially designed inductive (reactive)/resistive parallel component network that provides filtering across a wide frequency range from Hz to GHz at low and high voltage and current levels, coupled between a grounded return point 1145 and an earth/chassis ground 11105. The connection point 1145 between the EMI filter circuit 1130 and return or negative line 1125 forms a reference to equalize ground potential differences.

Also similar to the embodiment shown in FIG. 1, the preferred embodiment of the EMI filter circuit 1130 includes a resistor 1140 and a reactive portion, preferably an inductor 1135, both connected in parallel between the negative line 1125 and the ground 1105. An optional high frequency filter 1141 is connected between a negative/ground connection point 1145 and the output ground connection 1105. High frequency filter 1141 is optionally provided to bleed off and/or filter any high frequency noise radiating on or conducted through the ground connection. High frequency filter 1141 is most useful in an application where the circuit 1150 is to be used at the signal/electronic operating frequency of certain electronics to be connected, as various types of electronics create different levels of noise and operate at specific respective frequencies where such noise could cause further corruption. The details of construction of EMI filter circuit 1130 are substantially the same as those of EMI filter circuit 130 described above.

As further shown in FIG. 5, the circuit 1150 also includes a current sensor 1155, the details of construction of which are substantially the same as those of the current sensor 155 described above. In the circuit 1150, current sensor 1155 is employed to sense any differential between the current flowing from the positive line 1160 to the load 1120 and returning through the negative line 1125. If a fault condition exists, that is, when such a difference is sensed, the current sensor 1155 sends a signal to an evaluator controller 1170. In turn, controller 1170 evaluates the difference being sensed against a predetermined limit and sends to a breaker trip circuit 1175 a signal, which can be termed a "fault signal," the that limit is reached. Breaker trip circuit 1175 is connected before the EMI filter circuit 1130. Breaker trip circuit 1175 includes a breaker controller 1180 and a two-pole breaker 1200, or alternatively, breaker controller 1180 can be integrated with evaluator controller 1170 as a single controller. While breaker 1200 may take many forms, in the embodiment shown, the breaker 1200 includes two sets of breaker contacts 1190 and 1195. The signal from controller 1170 to breaker trip circuit 1175 causes breakers 1190 and 1195 of two pole breaker 1200 to trip into an open state, thereby preventing any flow of current on the positive line 1160 and the negative line 1125 to the EMI filter circuit 1130, and further, protecting personnel and equipment from a fault condition or shock hazard, such as if current is flowing through the ground, which can include a chassis or other object that can come into contact with people. A reset switch 1239 is included as is well known in the art to reset the breaker 1200 once any fault condition is corrected. In the embodiment shown in FIG. 5, the reset switch 1239 is a manual reset switch, but many different configurations of manual and automatic reset switches and circuits are available.

The preferred embodiment of circuit 1150 preferably includes a test circuit in order to ensure that the circuit 1150 is functional as required by safety standards. Many different configurations of manual and automatic test circuits are available, as is known in the art. In the embodiment shown in FIG. 5, the circuit 1150 includes a manual test circuit 1235, as but one example. The test circuit 1235 includes a resistor 1230 connected at one side to a switch 1233. The opposite side of the switch 1233 and the opposite side of the resistor 1230 are each connected via test lines 1231, 1232 to a respective one of the positive line 1160 and negative line 1125. One line 1231 passes through the current sensor 1155 and the other line 1232 does not. Hence, closing the switch 1233 results in a current flowing through the loop constituted by the switch, the resistor 1230 and lines 1231 and 1232. The fact that one of the lines 1231 passes through the current sensor 1155, and the other line 1232 does not, causes the current sensor to "sense" the passage of current as a potential fault since there will exist a differential between the current flowing in the two test lines. Such condition will open the breaker 1200, thereby confirming the function of the current sensor 1155, the controller 1170 and the trip coil breaker circuit 1175.

A single metal-oxide varistor (MOV) 1220 is shown in FIG. 5 connected before the breaker trip circuit 1175, for protecting the circuit 1150 from power surges. Additional MOVs or other surge suppression and normal mode filtering may be added as desired within the circuit, preferably before the EMI filter circuit 1130. In one embodiment, fuse 1990 is connected to controller 1180 or 1170 to trip all breakers at once, to enhance protection against fire and other hazards.

The embodiment shown in FIG. 5 also includes two LED indicators, the POWER-IN LED 1237 and the POWER-OUT LED 1238. The POWER-IN LED 1237 is illuminated when the circuit 1150 is properly receiving power from the power supply 1110. The POWER-OUT LED 1238 is intended to be an indicator for the state where the breaker circuit 1200 has been tripped. In the configuration shown, the POWER-OUT LED 1238 is lit when the breaker circuit 1200 is closed, and switches to being unlit when the breaker circuit trips to open. Numerous other indicator arrangements are available and well known in the art, some including LEDs and some including other means of indication, including audible alarms.

In operation, the present invention provides for the stabilization of the ground reference plane in a power source having a hot line, a return line, and a ground. First, any undesirable noise on ground and the return line is filtered out by use of the filter comprising the EMI filter circuit 130, which is connected between the ground and the neutral line. Thereafter, any substantial current imbalance between the level of current in the hot line and the level of current in the neutral line is detected. A fault signal is generated when the detected current imbalance exceeds a predetermined level. The connection between the power supply and the filter, as well as the hot and neutral lines to the load, are then interrupted in response to a fault signal.

While the apparatus hereinbefore described is effectively adapted to fulfill the aforesaid objects, it is to be understood that the invention is not intended to be limited to the specific preferred embodiments of ground stabilization networks set forth above. Rather, it is to be taken as including all reasonable equivalents to the subject matter of the appended claims.

What is claimed is:

1. A ground stabilization network, comprising:
   hot, neutral, and ground source connectors for connecting the device to hot, neutral, and ground lines, respectively, of a power source, and hot, neutral, and ground load connectors for connecting the device to hot, neutral, and ground lines, respectively, of a load;
   a breaker switch, the breaker switch being shiftable between an open position and a closed position, and having an input side and an output side, the input side being connected to both of the hot and neutral source connectors;
   an EMI filter circuit connected between neutral and ground, having a neutral input node, a neutral output node and a ground node, the neutral input node of the EMI filter circuit being connected to the neutral line of the output side of the breaker switch, the neutral output node being connected to the neutral line of the load connectors and the ground node being connected to ground, so as to ensure a reliable standardized ground reference;

a current sensor, positioned so as to sense current on the neutral line between the EMI filter circuit and the load, and so as to sense the current passing to the load on the hot line, and capable of generating a fault signal when a predetermined difference is sensed between the magnitude of current flowing in the hot line and the magnitude of current flowing in the neutral line; and a controller connected to the current sensor and the breaker switch, and capable of shifting the breaker switch from its closed position to its open position upon receiving the fault signal from the current sensor, to thereby interrupt the flow of current in both the hot and neutral connectors.

2. A ground stabilization network as recited in claim 1, further comprising a test circuit.

3. A ground stabilization network as recited in claim 2, wherein the test circuit comprises:
a switch having a first side and a second side;
a resistor having a first side and a second side, connected at its first side to the first side of the switch;
a first test line connecting the second side of the resistor to one of the hot line and the neutral line;
a second test line connecting the second side of the switch to the other of the hot line and the neutral line;
one of the first and second test lines passing through the current sensor and the other line not passing through the current sensor, such that closing the switch results in a current flowing through the loop constituted by the switch, the resistor and the test lines, thereby causing the current sensor to "sense" the passage of current as a potential fault so that the current sensor generates a fault signal.

4. A ground stabilization network as recited in claim 1, further comprising a high frequency filter connected to the EMI filter circuit at the output ground connection node to the load, so as to bleed off and/or filter any substantial high frequency noise radiating on or conducted through ground and neutral.

5. A ground stabilization network as recited in claim 1, wherein the EMI filter circuit includes resistive and reactive elements, each having an input ground connection node and an output ground connection node, and a neutral connection node.

6. A ground stabilization network as recited in claim 5 wherein the reactive element is an inductive element.

7. A ground stabilization network as recited in claim 6, wherein the inductive element includes:
a core;
a wire wrapped about the core in a single layer with no overlapping turns and maintaining a minimum spacing between an input end and an output end of the wire.

8. A ground stabilization network as recited in claim 7, wherein the windings are wrapped so the input end and output end exit on opposing sides of the core.

9. A ground stabilization network as recited in claim 7, wherein the core is a composite core.

10. A ground stabilization network as recited in claim 7, wherein the core is formed of high permeability ferrous (20-40%) and iron powder material (60-80%).

11. A ground stabilization network as recited in claim 1, further comprising a reset circuit, capable of shifting the breaker switch from its open position to its closed position.

12. A ground stabilization network for at least one phase of a three phase system, the ground stabilization network comprising:
hot, neutral and ground source connectors for connecting the device to respective hot neutral and ground lines, respectively, of at least one phase of a three phase power source, and respective hot, neutral and ground load connectors for connecting the device to hot, neutral and ground lines, respectively, of a load;

a breaker switch, the breaker switch being shiftable between an open position and a closed position, and having an input side and an output side, the input side being connected to both of the hot and neutral source connectors;

an EMI filter circuit connected between neutral and ground, having a neutral input node, a neutral output node and a ground node, the neutral input node of the EMI filter circuit being connected to the neutral line of the output side of the breaker switch, the neutral output node being connected to the neutral line of the load connectors and the ground node being connected to ground, so as to ensure a reliable standardized ground reference;

a current sensor, positioned so as to sense current on the neutral line between the EMI filter circuit and the load, and so as to sense the current passing to the load on the hot line, and capable of generating a fault signal when a predetermined difference is sensed between the magnitude of current flowing in the hot line and the magnitude of current flowing in the neutral line; and a controller connected to the current sensor and the breaker switch, and capable of shifting the breaker switch from its closed position to its open position upon receiving the fault signal from the current sensor, to thereby interrupt the flow of current in both the hot and neutral connectors.

13. A ground stabilization network, comprising:
positive, negative and ground source connectors for connecting the device to positive, negative and ground lines, respectively, of a power source, and positive, negative and ground load connectors for connecting the device to positive, negative and ground lines, respectively, of a load;

a breaker switch shiftable between an open position and a closed position, the breaker switch having an input side and an output side, the input side being connected to both of the positive and negative source connectors;

an EMI filter circuit connected between neutral and ground, having a neutral input node, side a neutral output node and a ground node, the neutral input node of the EMI filter circuit being connected to the negative line of the output side of the breaker switch, the neutral output node being connected to the negative line of the load connectors and the ground node being connected to ground, so as to ensure a reliable standardized ground reference;

a current sensor, positioned so as to sense current on the negative line between the EMI filter circuit and the load, and so as to sense the current passing to the load on the positive line, and capable of generating a fault signal when a predetermined difference is sensed between the magnitude of current flowing in the positive line and the magnitude of current flowing in the negative line; and a controller connected to the current sensor and the breaker switch, and capable of shifting the breaker switch from its closed position to its open position upon receiving the fault signal from the current sensor, to thereby interrupt the flow of current in both the positive and negative source connectors.

14. A method for stabilizing a ground reference plane in a power source having a hot line, a return line, and a ground, the method comprising:
filtering any undesirable noise on ground and the return line by use of a filter connected between the ground and the return line;

thereafter, detecting a current imbalance between a level of current in the hot line and the level of current in the return line;

generating a fault signal when the detected current imbalance exceeds a predetermined level; and interrupting the connection in both the hot and neutral connectors between the power supply and the filter circuit in response to a fault signal.

15. A method as recited in claim 14 further comprising interrupting the connection between the power supply and the load at the same time the connection between the power supply and the filter circuit are interrupted.

* * * * *